United States Patent Office 3,301,692
Patented Jan. 31, 1967

3,301,692
PROCESS OF TREATING PROTEINS AND THE PRODUCT THEREOF
Sulo A. Karjala and Frank K. Dering, both of Chicago, Ill., assignors to Wilson & Co., Inc., a corporation of Delaware
No Drawing. Filed Feb. 14, 1966, Ser. No. 527,040
10 Claims. (Cl. 106—161)

This application is a continuation-in-part of application Serial No. 111,433, entitled, Process of Treating Proteins and the Product Thereof, filed May 22, 1961, and now abandoned.

This invention relates to glues. More particularly, it relates to novel proteinaceous agents useful in glue manufacture. Still more particularly, it relates to proteinaceous materials of appreciable alkali solubility and to a novel method of producing the materials.

The proteinaceous agents of this invention are products of reaction of proteins and the polyfunctional aldehyde glyoxal. The reaction product is useful alone or in combination with other known adhesive materials in the manufacture of alkaline glues for such uses as the uniting of wood veneers in the manufacture of plywood. The proteinaceous products are also useful in other diverse applications such as paper board, press woods, etc.

Proteins of a number of different types have been used in the manufacture of glues. Vegetable proteins, such as soybean protein, and animal proteins, such as casein, animal blood proteins, etc., are used alone or in combination, in the preparation of commercial glues.

Animal blood proteins useful in the manufacture of glues are of two types, the so-called water-soluble bloods and the water-insoluble blood types, both of which are soluble in alkali. In water-soluble bloods, the protein solubility in water is ordinarily in the range of 80% to 100%.

Soluble or insoluble bloods may be prepared by dehydration, generally, of dried whole blood from which only a varying amount of the fibrin has been removed in processing, using drum dryers, spray dryers, etc.

Soluble bloods have the disadvantage of imparting low viscosity to aqueous alkaline solutions unless used in appreciable concentration with a resulting appreciable cost. Another disadvantage of the soluble bloods is that the alkaline glues prepared therefrom exhibit appreciable increasing viscosity change during the pot life of the glue.

Insoluble blood may be prepared by heating liquid blood to the coagulative point before drying, by drying at high temperatures and by subjecting dried soluble blood to heat. Heat treated products can be made so that they are water-insoluble, although possessing a high degree of alkali solubility and the ability to impart suitable viscosity characteristics to alkaline solutions. However, the heat denaturation processes have been difficult to control for uniformity in products and often produce products giving a wide variation in performance as evaluated as to pot life, spreadability and bonding characteristics. In order to alleviate the difficulties, the insoluble bloods have generally been used in admixture with other adhesive materials such as soybean flour, casein, etc.

Another form of proteinaceous material capable of developing high viscosity in alkaline glues has been prepared by the reaction of formaldehyde and other low molecular weight aldehydes possessing one reactive aldehyde group, with blood proteins. Formaldehyde-protein reaction products must be freshly prepared, i.e., the formaldehyde must be added to the freshly prepared aqueous glue, because the dry products are not stable in storage. Apparently, the reaction of formaldehyde and proteins is not arrested when the reaction mixture is reduced to powder form. Glues prepared from stored formaldehyde-containing reaction products show that the longer the time of storage, the higher the viscosity of the glue product prepared therefrom with the result being after storage for periods usual in the trade, a viscosity too high for use in, for example, a glue for wood veneering. In addition, the viscosity increases during such storage are irregular and unpredictable. The instability of the properties of the glues prepared from the protein-formaldehyde reaction products has limited the commercial utility of such products.

It has also been suggested that aldehydes or aldehyde precursors such as hexamethylene tetramine, acetals, etc., be added to prepared protein glues to react with the proteins in situ and to render the proteins insoluble in aqueous media. While this reaction between protein and an aldehyde reasonably could be expected to improve the water resistance of the finished glue, it has resulted in the production of glues whose characteristics are difficult to control.

The potentially insoluble protein-aldehyde reaction products formed in situ in a glue are different from the products of this invention. Applicants' dry reaction products, while relatively water-insoluble, remain dissolvable in alkaline solutions, have adhesive properties when redissolved and impart to a glue an extended "pot life."

It has now been discovered that it is possible to prepare certain proteinaceous reaction products which are water-insoluble but have substantial solubility in alkaline glue mixtures. The reaction products impart to the glues a viscosity that is controllable within specific limits and maintain a reasonably uniform viscosity over a period of hours.

The method of preparing these proteinaceous products involves the reaction of proteins with the di-aldehyde glyoxal in aqueous solution. In accordance with this invention, an aqueous solution of protein and glyoxal is reacted under appropriate conditions of reactant concentrations, temperature and holding time and then the resultant composition is dehydrated under conditions to control denaturation of the proteins and to convert the water-soluble reaction product to a water-insoluble, alkali soluble dry product.

Proteins useful in the preparation of the reaction product may be derived from vegetable or animal sources. Typical vegetable proteins are the aqueous extracts of defatted soya bean flour or peanut meal, etc. Animal blood proteins, because of the abundant supply, provide an excellent raw material. Bloods available in the greatest quantities are those from beef and hogs. Other bloods such as those of sheep, goats and horses may also be utilized. Any of the protein materials may be used alone or in admixture with other proteins. In this connection, it should be noted that proteins from different sources have varying compositions, i.e., contain, for example, greater or lesser quantities of the various amino acids such as lysine, and, consequently, will show variations in properties of the reaction product if identical processing conditions are adhered to. Beef blood, for example, yields a product of considerably higher viscosity than does hog blood for any given set of processing conditions. The properties of the reaction product are, therefore, subject to modification either through processing of mixtures of proteins or through variation of processing conditions. A protein starting material having beef and hog blood mixed in a weight ratio of between 1:1 and 2.5:1 is a typical example of a mixture of animal proteins. In the examples to follow, the starting materials for preparation of reaction products which can impart to a glue prepared therefrom a viscosity in the range between 5,000 and 25,000 centipoises, currently considered optimum for commercial glue spreaders, are hog blood, beef blood and mixtures of hog and beef bloods. A mixture of beef and hog blood of 2:1 ratio is commonly used, since it approximates the ratio of raw blood usually available from packing houses. However, different ratios of beef and hog blood may be used, depending on the desired viscosity to be imparted by the product.

The amount of glyoxal necessary to yield a product giving suitable viscosity is also dependent to some extent on the quality of the blood obtained from the packing houses. Blood which has been allowed to stand for some time under warm conditions, as in the summer, may undergo bacterial degradation to an extent where considerably more glyoxal is necessary in the reaction to obtain a product yielding desired viscosity.

The ability of the proteins from these various sources to react rapidly with glyoxal apparently depends to an appreciable extent upon the degree of concentration. Fresh blood, which contains 15% to 20% blood solids, reconstituted soluble blood, and blood solids concentrated under conditions avoiding appreciable heat denaturation of proteins, enter into the reaction with substantially equal facility. Bloods concentrated to between 30% and 35% have been preferred for preparation of products adapted to specific uses because use of higher concentration of solids in the reacted mixture reduced the cost of spray drying operations but, in general, preparation of products from unevaporated blood is the present trend.

Glyoxal reacts with the proteins to produce reaction products which are relatively stable on storage, i.e., products stored six months do not impart appreciably greater viscosity to glues than the product would have imparted if used when only two weeks old. This characteristic distinguishes the protein-glyoxal reaction product from reaction products of proteins and formaldehyde. The amount of glyoxal utilized in accordance with this invention varies from about 0.06% to about 2.4% of anhydrous glyoxal based upon the weight of the protein or upon the weight of blood solids. Preferably, the amount of glyoxal used for reaction with blood proteins is 0.3% to 0.75% when reacting concentrated beef blood, between 1.2% and 1.7% when reacting concentrated hog blood and between 0.65% and 1% when reacting mixtures of beef and hog blood present in a ratio of about 2:1, which preferred range of glyoxal is subject to shifting depending upon the relative proportions of beef and hog blood in the mixtures.

Glyoxal is commercially available as a relatively pure 40% solution in water, a solution of greater concentration and purity than the formerly available 30% solution.

When glyoxal is added to an aqueous protein solution such as blood, an increase in viscosity of the aqueous mixture will be noted upon standing. If the concentrations of glyoxal and blood solids are both sufficiently high, the mixture may gel irreversibly if allowed to react for a sufficient period of time, and the dried reaction product will then impart low viscosities to alkaline solutions.

To prevent formation of an irreversible gel and to avoid formation of insoluble material due to this cause, particularly when reacting the blood proteins with amounts of glyoxal in excess of about 1.5%, processing conditions designed to minimize gelling are utilized, i.e., reaction at minimum temperature, at maximum reactant dilution, etc. In this process the reactant mixture, containing relatively large amounts of glyoxal, is dehydrated before appreciable amounts of irreversible gel are formed and under conditions to minimize formation of insolubles so that a major proportion of the dry products are alkali soluble.

Blood entering into the reaction with glyoxal may have a solids content in the range of about 12% to 35%. Dilute solutions of blood proteins of the order of 12% to 20% react, with any fixed amount of glyoxal, at a markedly slower rate than the proteins of concentrated solutions. A blood protein solution of 18% solids concentration being reacted with 0.75% glyoxal added as a solution having a volume which is equal to the blood volume, may be held at room temperatures for a period in the range between 15 to 30 minutes and produce a reaction product capable of imparting a viscosity in the range of 10,000 to 80,000 centipoises to an alkaline solution. Dilute blood protein solutions can be reacted at room temperature prior to drying for as long as 4 to 6 hours and still produce a reaction product capable of imparting a viscosity in the range of 10,000 to 80,000 centipoises to an alkaline solution, provided the glyoxal content dues not exceed about 0.75% and the volume of the glyoxal solution added is equal to that of the blood solution. In contrast, a concentrated blood of about 32% solids, reacted with 0.75% of glyoxal added as a solution having a volume which is 10% of the blood volume, requires only a 6 seconds reaction time in order for the reaction product to impart a viscosity in excess of 30,000 centipoises.

In order to provide a readily controllable reaction, particularly at the higher concentrations of blood proteins, and to avoid an insolubilizing type of reaction, the required amount of glyoxal is generally added in the form of a water solution having a volume in the range between about 5% and about 100% of the volume of the blood solution, and preferably in the range between 5% and 10%. Inasmuch as the reaction of proteins and glyoxal is markedly affected by the relative concentrations of proteins and glyoxal in the reacting mixture, it may be desirable at times to introduce glyoxal in a more dilute aqueous solution form whose volume is greater relative to the volume of the blood solution. If the blood protein solution is a dilute one, glyoxal can be added in a concentrated form, i.e., 40% glyoxal, without appreciable gelling of the mixture.

If concentrated blood having a solids content of 30% to 35% is reacted with a glyoxal solution containing, for example, 0.75% glyoxal based on the dry blood solids and having a volume equal to 10% of the volume of the blood, this mixture can be reacted without appreciable gelling of the liquid mixture.

Reaction time, as explained before is interrelated with concentration of reactants and temperature of reaction. For a given concentration of reactants and temperature for the reacting mixture, reaction time prior to drying is optimum within a rather narrow range. Reaction time is usually chosen to produce a reaction product with a desirable viscosity in alkaline solution measured by the hereinafter described test, generally a viscosity in the range of 10,000 to 80,000 centipoises. When lower viscosities are desired, it will be understood that the interrelated factors of concentration, temperature and amount of glyoxal will be adjusted, for example, by using a lower concentration of glyoxal in the blood since it is easier and more practical to modify the concentration of glyoxal in the reacting liquid mixture.

When adding the same amount of glyoxal to a concentrated blood in a volume equal to 10% of the blood volume, the reaction time necessary in order that the product will exhibit a viscosity in excess of 30,000 centipoises, will be of the order of 1 to 15 seconds and the reaction time prior to drying may not be extended beyond 30 seconds before the product will exhibit deleterious changes in viscosity in alkaline solutions.

When the reaction time is of such short duration as 1 to 2 seconds, the most satisfactory mixing procedure consists in metering the glyoxal solution into a blood solution in a mixing zone or feed pipe of the dryer adapted to maintain turbulent conditions of liquid flow.

Although reaction products yielding appropriate viscosities in alkaline solution can be obtained with a reaction time of 1 to 2 seconds, there is a possibility of obtaining an inhomogeneous product due to the failure of the reactants to mix completely in this short a reaction time. To insure good mixing, an inline mixer of suitable volume to permit a preferred reaction time of 5 to 15 seconds, is placed on the dryer feed line.

Another factor affecting the reaction of proteins and glyoxal is temperature. At temperatures below about 110° F., for example, between 60° F. and 110° F., when using any fixed concentration of reactants, the time of reaction varies inversely with temperature, i.e., the higher the reaction temperature, the shorter the reaction time to obtain products imparting a viscosity of the same order of magnitude. At temperatures above 110° F., for example, at 120° F., the reaction is accelerated but the higher temperatures may effect heat denaturation of proteins unless the exposure to this temperature is of very short duration. Heat denaturation of the proteins must be avoided if a product of substantially complete solubility in alkaline solution is to be obtained, but a reaction product of partially denatured proteins has utility for some uses and, therefore, some denaturation may be tolerated.

The influence of temperature is minimized when the concentrations of blood and glyoxal are such that an almost instantaneous reaction, i.e., 2 to 12 seconds is obtained. Under these conditions, a product producing viscosities of the same order of magnitude is obtained at a reaction temperature of 60° F. as is obtained at 110° F.

In general, the higher the reactant concentrations in the mixture and the higher the reacting temperature, the shorter the holding time required to produce a reaction product which will be soluble in alkalies at a temperature of about 70° F. and will impart a viscosity to glue in the range considered optimum for use in commercially available glue spreaders.

The reaction of glyoxal and proteins when reactants are brought together initially as aqueous solutions, proceeds at a rapid rate as evidenced by a two to six second reaction time under such conditions as have been explained hereinbefore.

Following mixing, the protein-glyoxal reaction product is reduced to a dry state by methods such as by evaporation of water through application of heat such as by spray drying. In such a dehydration step, the water-soluble reaction product is converted to a water-insoluble, alkali-soluble powdered product. When the dehydration of the reaction product is carried out, it must be recognized that the reaction between proteins and glyoxal continues until the reaction mixture is relatively low in moisture content. Prior to attaining the necessary low moisture content, some heat denaturation of protein may occur. When the dehydration is carried out in, for example, a spray dryer, the temperature of the solids must not reach a point where the reaction product is rendered insoluble in alkaline solution. Appropriate drying conditions are generally maintained by limiting the temperature of the air leaving the dryer to a temperature of about 200° F. and preferably by maintaining the air outlet temperature at about 180° F. or lower.

The effect of higher temperatures in the dryer upon the viscosity imparted to alkaline solution by the reaction product may be counterbalanced by such changes in processing as a reduction in the holding time prior to drying and/or by reducing the glyoxal content of the reacting mixture. If the air outlet temperature is increased to about 200° F., the glyoxal content of the reacting mixture should preferably be reduced.

When the dehydration of the reaction product has been carried out and a dry product of relatively low moisture content is being produced with the dry solid product attaining elevated temperatures, the reaction of proteins and glyoxal continues at a relatively rapid rate at the dryer temperatures in the presence of water, after which time the reaction continues at a relatively slow rate until reaction is substantially completed. This slow reaction is generally believed to continue for a short period after the product is delivered to storage since a temperature rise can be measured in packaged material during the first week of storage, following which the product cools to the ambient temperature.

After the reaction has gone to substantial completion, as evidence by an increase in the viscosity in alkaline solution over that of the material at the time it was collected from the dryer, the product is stable and may be stored for periods of, for example, up to a year without deleterious further appreciation in viscosity.

On the other hand, if the viscosity of the reaction product in alkaline solution is less than desired, an increase in viscosity within a narrow range, can be attained without appreciable increase in insolubility due to denaturation of the proteins by subjecting dry products to temperatures generally of the order of 100° F. to 120° F. for varying periods of time as by holding the products for varying periods in storage at these elevated temperatures.

Products of this invention, to have utility in glues, must have appreciable solubility in alkaline solutions. Solubility of reaction products is determined by dispersing the material in water maintained at 70° F. to form a dispersion of 2.5% solids content. Sodium hydroxide in the amount of 0.1 gram per gram of blood-glyoxal reaction product present in the dispersion is added and the mixture is agitated for 10 minutes. After 10 minutes, a portion of the mixture is centrifuged and aliquots of the centrifuged and uncentrifuged material are dried and weighed. The difference between the two weights, after subtraction of the known amount of alkali present, gives a measure of the amount which has been solubilized by the alkali. When preparing products utilizing mixtures of hog and beef blood proteins, the substantially soluble reaction products showed 80% thereof or more, to be soluble in the alkaline solutions of the alkali concentration of the test. It is to be recognized that this alkali solubility determination is only an analytical tool for characterizing and evaluating these blood protein reaction products intended for use in glue and that at the alkali concentration actually used in the production of glue substantially all of the products showing 80% solubility in the above test, will be soluble in an alkaline glue mix. However, it should be recognized that as such variables as type of protein reagent concentration, temperature, etc., are altered, reaction products can be produced which vary in viscosity and solubility in alkaline solutions, with the result that solubilities below 80% by the above test, may be exhibited, i.e., solubilities of the order of 50%, and the reaction products may still have utility in the highly alkaline glues.

The invention will be better understood from the following examples which are given by way of illustration but without any intention that the invention be limited thereto.

PREPARATION OF REACTION PRODUCTS

*Example I*

A blood mixture containing by weight approximately two parts of beef blood and one part of hog blood was concentrated to a solids content of approximately 33%. To approximately 3770 pounds of blood concentrate being pumped into a spray dryer at a rate of 24.5 pounds per minute at 100° F. was added a glyoxal solution containing 31 pounds of 30% glyoxal solution diluted with approximately 364 pounds of water. The glyoxal solution was metered at a rate of 2.45 pounds per minute of solution into the blood being fed to the spray dryer at a point providing a reaction time of 12 seconds before the mixture reached the sprayer. The concentration of glyoxal based on the blood solids, was 0.75%.

The mixture was spray dried while maintaining an air outlet temperature from the drying chamber of approximately 180° F.

The method of determining the viscosity in alkaline solutions of the product is described hereinafter. The viscosity of the product, as determined by this test, is set forth in Table A which compiles comparative data for a number of the products into a single table.

Example II

A blood mixture containing by weight approximately two parts of beef blood and one part of hog blood was concentrated to a solids content of approximately 33%. To approximately 3770 pounds of blood concentrate being pumped into a spray dryer at a rate of 24.5 pounds per minute at 100° F., was added a glyoxal solution containing 31 pounds of 30% glyoxal solution diluted with approximately 364 pounds of water. The glyoxal solution was metered at a rate of 2.45 pounds per minute of solution into the blood being fed to the spray dryer at a point providing a reaction time of 6 seconds before the mixture reached the sprayer. The concentration of glyoxal based on the blood soilds was 0.75%.

The mixture was spray dried while maintaining an air outlet temperature from the drying chamber of approximately 180° F.

The method of determining the viscosity in alkaline solutions of the product is described hereinafter. The viscosity of the product, as determined by the described test, is set forth in Table A.

Example III

A blood mixture containing by volume approximately two parts of beef blood and one part hog blood was concentrated to a solids content of approximately 32%. To approximately 2610 pounds of the blood concentrate was added a glyoxal solution containing 27.7 pounds of 30% glyoxal solution diluted with approximately 270 pounds of water. The mixture was agitated during the holding period. The concentration of glyoxal based on the blood solids was 1.0%.

The reactants were held in a tank maintained at room temperature. After one-half hour, pumping to the spray dryer having an air outlet temperature of 180° F. was initiated. The last of the reacting mixture was pumped to the dryer two hours after initiation of drying, so that the last portion of the tank contents had a 2½ hour reaction time and the average reaction time of the product of this example was 1½ hours.

The viscosity of the product, as determined in accordance with the hereinafter described method, is shown in Table A.

Example IV

A beef blood was concentrated to a solids content of approximately 35%. The concentrate was split into portions A through F. Portion A was spray dried in the spray dryer having a dryer gas outlet temperature of about 175° F. The viscosity of this dried blood as determined by the test at 60 minutes was 160 centipoises.

To approximately 377 pounds of portion B of the concentrate being pumped into a spray dryer at a rate of approximately 18.8 pounds per minute at 90° F. was added glyoxal solution containing 0.208 pound of 40% glyoxal solution diluted with approximately 40 pounds of water. The glyoxal solution was metered at a rate of 2 pounds per minute of solution into the concentrated blood being fed to the dryer at a point providing a reaction time of 6 seconds before the mixture reached the sprayer. The concentration of glyoxal based on the blood solids was 0.06%.

The mixture was spray dried while maintaining an air outlet temperature from the drying chamber of approximately 175° F. The viscosity of the product, as determined by the hereinafter described test, was 580 centipoises at a time of 60 minutes.

A significant increase in viscosity is demonstrated here but, clearly, the reaction time of 6 seconds was too short for the amount of glyoxal used to have a product developing a viscosity of a magnitude such as that shown to be developed by the product of Example V, etc., at the same 6 second reaction time when utilized in an alkaline solution containing 10% of reaction product. Higher concentrations of this reaction product will show a greater viscosity.

Example V

To approximately 377 pounds of portion C of the concentrate being pumped into a spray dryer at a rate of approximately 18.8 pounds per minute at 90° F. was added glyoxal solution containing 0.415 pound of 40% glyoxal solution diluted with approximately 40 pounds of water. The glyoxal solution was metered at a rate of 2 pounds per minute of solution into the concentrated blood being fed to the dryer at a point providing a reaction time of 6 seconds before the mixture reached the sprayer. The concentration of glyoxal based on the blood solids was 0.13%.

The mixture was spray dried while maintaining an air outlet temperature from the drying chamber of approximately 175° F. The viscosity of the product, as determined by the hereinafter described test, was 5000 centipoises at a time of 60 minutes.

Example VI

To approximately 377 pounds per portion D of the concentrate being pumped into a spray dryer at a rate of approximately 18.8 pounds per minute at 90° F. was added glyoxal solution containing 1.04 pounds of 40% glyoxal solution diluted with approximately 39 pounds of water. The glyoxal solution was metered at a rate of 2 pounds per minute of solution into the concentrated blood being fed to the dryer at a point providing a reaction time of 6 seconds before the mixture reached the sprayer. The concentration of glyoxal based on the blood solids was 0.3%.

The method of determining the viscosity in alkaline solutions of the product is described hereinafter. The viscosity of the product, as determined by this test, is set forth in Table A which compiles comparative data for a number of the products into a single table.

Example VII

To approximately 377 pounds of portion E of the concentrate being pumped into a spray dryer at a rate of approximately 18.8 pounds per minute at 90° F. was added glyoxal solution containing 2.08 pounds of 40% glyoxal solution diluted with approximately 38 pounds of water. The glyoxal solution was metered at a rate of 2 pounds per minute of solution into the concentrated blood being fed to the dryer at a point providing a reaction time of 6 seconds before the mixture reached the sprayer. The concentration of glyoxal based on the blood solids was 0.6%.

The mixture was spray dried while maintaining an air outlet temperature from the drying chamber of approximately 175° F. The viscosity of the product, as determined by the hereinafter described test, was 58,000 centipoises at a time of 60 minutes.

Example VIII

To approximately 377 pounds of portion F of the concentrate being pumped into a spray dryer at a rate of approximately 18.8 pounds per minute at 90° F. was added glyoxal solution containing 3.12 pounds of 40% glyoxal solution diluted with approximately 37 pounds of water. The glyoxal solution was metered at a rate of 2 pounds per minute of solution into the concentrated blood being fed to the dryer at a point providing a reaction time of 6 seconds before the mixture reached the sprayer. The concentration of glyoxal based on the blood solids was 1.0%.

The mixture was spray dried while maintaining an air outlet temperature from the drying chamber of approximately 175° F. The viscosity of the product, as determined by the test, is set forth in Table A which compiles comparative data for a number of the products into a single table.

Example IX

Hog blood was concentrated to a solids content of approximately 34.5%. The hog blood was split into portions G through K. Portion G was dehydrated in the spray dryer using the air outlet temperature of approximately 165° F. The viscosity of this dried blood, as determined by the test at 60 minutes, was 20 centipoises.

To approximately 503 pounds of portion H of the concentrate being pumped into a spray dryer at a rate of approximately 25.1 pounds per minute at 90° F. was added glyoxal solution containing 5.00 pounds of 40% glyoxal solution diluted with approximately 35 pounds of water. The glyoxal solution was metered at a rate of 2 pounds per minute of solution into the concentrated blood being fed to the dryer at a point providing a reaction time of 6 seconds before the mixture reached the sprayer. The concentration of glyoxal based on the blood solids was 1.2%.

The mixture was spray dried while maintaining an air outlet temperature from the drying chamber of approximately 165° F. The viscosity of the product, as determined by the hereinafter described test, was 240 centipoises at a time of 60 minutes.

Example X

To approximately 503 pounds of portion I of the concentrate being pumped into a spray dryer at a rate of approximately 25.1 pounds per minute at 90° F. was added glyoxal solution containing 5.82 pounds of 40% glyoxal solution diluted with approximately 34 pounds of water. The glyoxal solution was metered at a rate of 2 pounds per minute of solution into the concentrated blood being fed to the dryer at a point providing a reaction time of 6 seconds before the mixture reached the sprayer. The concentration of glyoxal based on the blood solids was 1.3%.

The mixture was spray dried while maintaining an air outlet temperature from the drying chamber of approximately 165° F. The viscosity of the product, as determined by the hereinafter described test, was 1250 centipoises at a time of 60 minutes.

Example XI

To approximately 503 pounds of portion J of the concentrate being pumped into a spray dryer at a rate of approximately 25.1 pounds per minute at 90° F. was added glyoxal solution containing 6.65 pounds of 40% glyoxal solution diluted with approximately 33 pounds of water. The glyoxal solution was metered at a rate of 2 pounds per minute of solution into the concentrated blood being fed to the dryer at a point providing a reaction time of 6 seconds before the mixture reached the sprayer. The concentration of glyoxal based on the blood solids was 1.5%.

The mixture was spray dried while maintaining an air outlet temperature from the drying chamber of approximately 165° F. The viscosity of the product, as determined by the test, is set forth in Table A which compiles comparative data for a number of the products into a single table.

Example XII

To approximately 503 pounds of portion K of the concentrate being pumped into a spray dryer at a rate of approximately 25.1 pounds per minute at 90° F. was added glyoxal solution containing 7.50 pounds of 40% glyoxal solution diluted with approximately 32.5 pounds of water. The glyoxal solution was metered at a rate of 2 pounds per minute of solution into the concentrated blood being fed to the dryer at a point providing a reaction time of 6 seconds before the mixture reached the sprayer. The concentration of glyoxal based on the blood solids was 1.7%.

The mixture was spray dried while maintaining an air outlet temperature from the drying chamber of approximately 165° F.

The method of determining the viscosity in alkaline solutions of the product is described hereinafter. The viscosity of the product, as determined by the test, is set forth in Table A which compiles comparative data for a number of the products into a single table.

Example XIII

An unevaporated hog blood containing 16.8% solids was divided into portions L and M. Portion L was spray dried in the spray dryer with an air outlet temperature of approximately 165° F. The viscosity of this dried blood, as determined by the test at 60 minutes, was 20 centipoises.

To approximately 714 pounds of portion M of the blood being pumped into a spray dryer at a rate of approximately 17.8 pounds per minute at 90° F. was added glyoxal solution containing 6.6 pounds of 40% glyoxal solution diluted with approximately 74 pounds of water. The glyoxal solution was metered at a rate of 2 pounds per minute of solution into the blood being feed to the dryer at a point providing a reaction time of 6 seconds before the mixture reached the sprayer. The concentration of glyoxal based on the blood solids was 2.2%.

The mixture was spray dried while maintaining an air outlet temperature from the drying chamber of approximately 165° F.

Viscosity in alkaline solution of this product was determined by the hereinafter described test at 8% reaction product solids instead of 10%. This viscosity was 24,000 centipoises at a time of 60 minutes.

Example XIV

A blood mixture containing by volume approximately two parts of beef blood and one part of hog blood was concentrated to a solids content of approximately 33%. To approximately 3,770 pounds of blood concentrate, being pumped into a spray dryer at a rate of 24.5 pounds per minute at 100° F., was added a formaldehyde solution containing 25.2 pounds of 37% formaldehyde solution diluted with approximately 350 pounds of water. The formaldehyde solution was metered at a rate of approximately 2.5 pounds per minute of solution into the feed to the spray dryer at a point providing a reaction time of approximately 12 seconds before the mixture reached the sprayer. The concentration of formaldehyde based on the blood solids was 0.75%. The mixture was spray dried while maintaining an air outlet temperature of approximately 180° F. The viscosity of this product is shown in Table A.

The viscosity in alkaline solutions and the alkali solubility of the glyoxal products are markedly superior to those of formaldehyde products. The solubility of the product of Example I, determined as hereinbefore described, was 96% for the fresh product. After storage at 100° F. for 55 days, the alkali solubility of the glyoxal containing product was 85%. In contrast, the product of Example IV had an alkali solubility of 95% when freshly prepared. After only 14 days of storage at 100° F. the alkali solubility was only 44%. Alkali solubility of the product of Example II was 98% when freshly prepared and after storage at 100° F. for 84 days, the alkali solubility was approximately 87%. It can be seen from this data that the glyoxal-protein reaction products have excellent storage stability.

VISCOSITY DETERMINATION

Viscosity imparted to alkaline solutions by the various products was determined as follows:

A set amount of reaction product was dispersed in sufficient water to yield a solution containing 10% blood solids after the addition of 7.5 milliliters of 1 normal sodium hydroxide per each 2.4 grams of blood solids. The alkali was added to the dispersion with agitation and stirring until the mixture is uniform. The viscosity of the alkaline solution was measured at suitable intervals as indicated in Table A, using a Brookfield viscosimeter with the proper size spindle rotating at 20 revolutions per minute.

TABLE A.—VISCOSITIES

| | Percent Glyoxal | Time in Minutes | | | | |
|---|---|---|---|---|---|---|
| | | 30 | 60 | 120 | 180 | 210 |
| Product of Example I | | | | | | |
| Fresh | | 30,000 | 30,000 | 29,000 | | 23,000 |
| Stored 55 days at 100° F | 0.75 | 45,000 | 36,000 | 24,000 | | 17,000 |
| Product of Example II | 0.75 | | | | | |
| Fresh | | 51,000 | 52,600 | 37,800 | | 18,000 |
| Stored 84 days at 100° F | | 52,000 | 51,000 | 47,000 | | 34,000 |
| Product of Example III | 1.0 | | | | | |
| Fresh | | 36,000 | 47,000 | | | |
| Stored 11 months at room temperature | | | | 89,000 | | 58,000 |
| Product of Example VI | 0.3 | | | | | |
| Fresh | | 27,750 | 39,000 | 25,000 | 12,500 | |
| Stored 2 weeks at 100° F | | 70,000 | 92,000 | 70,000 | 48,000 | |
| Product of Example VIII | 1.0 | | | | | |
| Fresh | | 70,000 | 74,000 | 66,000 | 58,000 | |
| Stored one week at 100° F | | 60,000 | 60,000 | 52,000 | 52,000 | |
| Product of Example XI | 1.5 | | | | | |
| Fresh | | 36,000 | 32,000 | 22,000 | 14,000 | |
| Stored 2 weeks at 100° F | | 33,000 | 30,000 | 22,000 | 16,000 | |
| Product of Example XII | 1.7 | | | | | |
| Fresh | | 40,000 | 36,000 | 32,000 | 24,000 | |
| Stored 2 weeks at 100° F | | 26,000 | 29,000 | 28,000 | 22,000 | |
| | Percent Formaldehyde | | | | | |
| Product of Example XIV | 0.75 | | | | | |
| Fresh | | 70,000 | 78,000 | 75,000 | 78,000 | 42,000 |
| Stored 14 days at 100° F | | [1] 200,000 | (Out of range of instrument) | | | |

[1] Over.

In order to fully understand the novel character of applicants' protein-glyoxal reaction products, the characteristics which can be observed from Table A must be compared with the viscosity in alkaline solutions of other products. From Table A, it can be observed that the reaction products at 10% solids concentration maintain a high viscosity level over a period of up to 3 hours.

Ordinary soluble bloods at this solids concentration level of 10%, seldom produce alkaline solutions with viscosities greater than 200 centipoises as shown for the dried blood products of Examples IV, IX and XIII which were not reacted with glyoxal. Alkaline solutions of ordinary soluble blood containing 15% to 12% solids show a greater variation in viscosity with time than do alkaline solutions of the glyoxal-treated bloods in the same viscosity range. Not only do the blood-glyoxal reaction products develop a high viscosity at lower concentrations than do soluble bloods, but the viscosities are more uniform and stable. Moreover, products with higher or lower alkaline viscosity characteristics can readily be attained by appropriate modification of the reaction condition used to produce the glyoxal modified blood.

The viscosity characteristics or ordinary soluble blood are highly dependent upon the ratio of beef to hog blood in the mixture. This effect appears to be diminished upon treatment of the blood with glyoxal, with the result that there is less variation in the viscosity characteristics of treated bloods when the beef-hog ratio is varied over a considerable range.

The novel products of this invention also show viscosity characteristics markedly different from those of protein-formaldehyde reaction products after storage. After only 14 days storage at 100° F., the product of Example XIV exhibits a viscosity change from 70,000 up to over 200,000 centipoises whereas the viscosity of the product of the examples shows a variation in viscosity by the described test generally of less than 20,000 centipoises, differences at least a part of which could be attributed to procedural variations. Even the product of Example III, which has been stored at room temperature for eleven months, and demonstrated some increase in viscosity after this long storage period, was still within a range suitable for use in glues.

The dry product of this invention may be processed to form a glue by dissolution in water and adding various glue making agents for the production of an adhesive having the desired properties. It may also be used in combination with soy flour, casein, phenol-formaldehyde resins, etc., to form a glue.

Such agents, generally referred to as "glue conditioning chemicals" comprise, in general, alkali metal caustic such as sodium and potassium hydroxide, alkali silicates, hydrated lime, and the like.

Thermosetting resins, filler, and other suitable additives common to the glue trade may be incorporated in the glue.

The reaction product of blood protein and glyoxal and the glue conditioning chemicals are mixed together in the desired proportions together with the amount of water necessary for the production of a glue having the desired consistency. Although the proportions of constituents in a given glue formulation are variable, in general, a typical plywood glue will fall within the following ranges, proportions being expressed in percentage by weight.

TABLE B

| Material: | Range, percent |
|---|---|
| Reaction product of this invention | 8 to 12 |
| Filler | 2 to 5 |
| Water | 50 to 70 |
| Alkali Metal Caustic | 1 to 10 |
| Alkali Metal Silicate | 5 to 18 |
| Hydrated Lime | 1 to 10 |

In addition to the foregoing constituents, there may be included an anti-foaming agent such as pine oil. In general, from 0.5% to 1.0% of pine oil based on the finished glue mix are suitable for the purpose, but anti-foaming agent may be added in amounts required to overcome any foaming problem which may be present.

The glue mixtures, prepared as described, may be applied in the plywood fabricating operation using the conventional glue spreaders and other equipment. Their application in such equipment is particularly easy because of their stable viscosity and non-gelling characteristics. Viscosity of the glues used in plywood fabricating operations generally fall within the range of 5000 to 25,000 centipoises which viscosity is not to be confused with the viscosities shown hereinbefore which are based upon a very specific test. After applying the glue, the veneers may be assembled in the usual manner and pressed, either in a cold press or a hot press, depending upon the particular composition employed and the plywood application contemplated.

The above detailed description of this invention is given for clearness of understanding and no limitations are to be understood therefrom, as modifications will be apparent to those skilled in the art.

We claim:

1. A composition of matter comprising a powdered product, said product being a product of reaction of blood protein and glyoxal and containing an amount of glyoxal constituting between 0.06% and 2.4% based upon the weight of blood solids, said product being substantially insoluble in water and having a major portion of the product soluble in an alkaline solution.

2. A composition of matter as described in claim 1 in which the blood proteins are concentrated blood proteins derived by mixing beef blood and hog blood in a ratio between 1:1 and 2.5:1 and the amount of glyoxal constitutes between 0.5% and 2% based upon the weight of blood solids.

3. A composition of matter as described in claim 1 in which the blood proteins are concentrated beef blood proteins and said product contains an amount of glyoxal constituting between about 0.3% and 0.75% based upon the weight of blood solids.

4. A composition of matter as described in claim 1 in which the blood proteins are concentrated hog blood proteins and said product contains an amount of glyoxal constituting between about 1.2% and 1.7% based upon the weight of blood solids.

5. The method of preparing a substantially water insoluble proteinaceous material which dissolves in alkaline solution enhancing the viscosity thereof, comprising introducing glyoxal into an aqueous blood protein solution having a blood solids concentration in the range between 12% and 35%, in an amount in the range between 0.06% and 2.4% based upon the weight of the blood solids, reacting the mixture at a temperature in the range between 60° F. and 120° F. for a period in the range between two seconds and about four hours, and thereafter dehydrating the reacted mixture at temperatures in the range between about 165° F. and about 200° F., whereby a reaction product is produced which is substantially insoluble in water and has a major portion thereof soluble in alkaline solution.

6. The method according to claim 5 in which the blood solids being reacted are a concentrate of beef blood proteins and the glyoxal is introduced in an amount in the range between 0.3% and 0.75% based upon the weight of blood solids.

7. The method according to claim 5 in which the blood solids being reacted are a concentrate of hog blood proteins and the glyoxal is introduced in an amount in the range between 1.2% and 1.7% based upon the weight of blood solids.

8. The method according to claim 5 in which the blood solids are a concentrate of a mixture of beef and hog blood proteins present in a ratio in the range between 1:1 and 2.5:1 and the glyoxal is introduced in an amount in the range between 0.5% and 2% based upon the weight of blood solids.

9. A glue consisting essentially of 8% to 12% of a product of reaction of blood proteins and glyoxal, said product being substantially insoluble in water due to dehydration of the reaction product at temperatures in the range between about 165° F. and 200° F. and having a major portion thereof soluble in alkaline solution, between about 2% and 5% of filler, between about 50% and 70% of water, between about 1% and 10% of alkali metal caustic, between about 5% and 18% alkali metal silicate and between about 1% and 10% of hydrated lime.

10. A glue according to claim 9 in which the protein-glyoxal reaction product contains glyoxal in an amount up to 2%, said product being substantially insoluble in water and at least 80% soluble in alkaline solution which is a 2.5% solids content dispersion of said product in water and containing 0.1 gram of sodium hydroxide per gram of said product, maintained at 70° F. and agitated for ten minutes.

References Cited by the Examiner

UNITED STATES PATENTS

| | | | |
|---|---|---|---|
| 1,976,435 | 10/1934 | Cone | 106—78 |
| 2,591,133 | 4/1952 | Campbell et al. | 260—117 |
| 2,874,134 | 2/1959 | Gossett et al. | 106—161 |
| 2,931,845 | 4/1960 | Lehmann et al. | 260—117 |
| 3,028,308 | 4/1962 | Zambito et al. | 260—117 |
| 3,080,244 | 3/1963 | Cone et al. | 106—124 |

OTHER REFERENCES

Craenkel-Conrat et al.: Journal of Am. Chemical Society, vol. 67 (1945) pp. 950–954.

Olcott et al.: Industrial and Engineering Chemistry, vol. 38, pp. 104–106.

ALEXANDER H. BRODMERKEL, *Primary Examiner.*

D. J. ARNOLD, *Assistant Examiner.*